(12) United States Patent
Hashimoto

(10) Patent No.: US 7,756,529 B2
(45) Date of Patent: *Jul. 13, 2010

(54) POSITION INFORMATION MANAGEMENT METHOD AND APPARATUS

(75) Inventor: Ken Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 207 days.

This patent is subject to a terminal disclaimer.

(21) Appl. No.: 11/427,808

(22) Filed: Jun. 30, 2006

(65) Prior Publication Data

US 2006/0259240 A1 Nov. 16, 2006

Related U.S. Application Data

(63) Continuation of application No. 11/244,003, filed on Oct. 6, 2005, which is a continuation of application No. 08/902,153, filed on Jul. 29, 1997, now Pat. No. 6,999,779.

(30) Foreign Application Priority Data

Feb. 6, 1997 (JP) ................... 09-024106

(51) Int. Cl.
G01C 21/00 (2006.01)
(52) U.S. Cl. .................. 455/456.2; 455/456.6
(58) Field of Classification Search ......... 455/440, 455/404, 456.1, 414.1; 342/357.14, 385, 342/417; 701/207, 210, 216
See application file for complete search history.

(56) References Cited

U.S. PATENT DOCUMENTS

| 4,731,613 A | 3/1988 | Endo et al. |
| 4,806,940 A | 2/1989 | Harral et al. |
| 4,953,179 A | 8/1990 | Mita et al. |

(Continued)

FOREIGN PATENT DOCUMENTS

EP 0 006 448 1/1980

(Continued)

OTHER PUBLICATIONS

UK Examination Report for corresponding application No. GB 9716207.7 dated Apr. 30, 2001.

(Continued)

*Primary Examiner*—Sam Bhattacharya
(74) *Attorney, Agent, or Firm*—Staas & Halsey LLP

(57) ABSTRACT

A position information management system in which a portable remote terminal includes a plurality of kinds of positioning means for positioning based on a GPS, positioning based on a portable-telephone or PHS base station, positioning based on a radio marker, and independent positioning based on a direction detector, so that the holder of the portable remote terminal can be navigated anywhere. The holder of the portable remote terminal can know the position of a third party similarly holding such a portable remote terminal, by inquiring of a central system, and he/she can supervise, for example, the action of an old person, a child, or a skier in a skiing area. Further, only the map data of a district which is often used by the holder is stored in the portable remote terminal. In this regard, when the holder is in a district not contained within the retained map data, he/she downloads corresponding map data from the central system and uses the downloaded map data.

14 Claims, 10 Drawing Sheets

U.S. PATENT DOCUMENTS

| | | | |
|---|---|---|---|
| 5,208,756 A | 5/1993 | Song | |
| 5,223,844 A | 6/1993 | Mansell et al. | |
| 5,317,321 A | 5/1994 | Sass | |
| 5,327,144 A | 7/1994 | Stilp et al. | |
| 5,389,934 A | 2/1995 | Kass | |
| 5,416,712 A | 5/1995 | Geier et al. | |
| 5,418,537 A | 5/1995 | Bird | |
| 5,420,594 A | 5/1995 | FitzGerald et al. | |
| 5,422,813 A | 6/1995 | Schuchman et al. | |
| 5,426,690 A | 6/1995 | Hikuma et al. | |
| 5,461,390 A | 10/1995 | Hoshen | |
| 5,504,491 A | 4/1996 | Chapman | |
| 5,519,403 A | 5/1996 | Bickley et al. | |
| 5,535,431 A * | 7/1996 | Grube et al. | 455/411 |
| 5,548,822 A | 8/1996 | Yogo | |
| 5,604,765 A | 2/1997 | Bruno et al. | |
| 5,642,398 A | 6/1997 | Tiedemann, Jr. et al. | |
| 5,644,317 A | 7/1997 | Weston et al. | |
| 5,661,652 A | 8/1997 | Sprague et al. | |
| 5,669,061 A | 9/1997 | Schipper | |
| 5,689,269 A | 11/1997 | Norris | |
| 5,717,406 A | 2/1998 | Sanderford et al. | |
| 5,742,233 A | 4/1998 | Hoffman et al. | |
| 5,760,742 A | 6/1998 | Branch et al. | |
| 5,832,394 A | 11/1998 | Wortham | |
| 5,848,373 A | 12/1998 | DeLorme et al. | |
| 5,857,155 A | 1/1999 | Hill et al. | |
| 5,862,511 A | 1/1999 | Croyle et al. | |
| 5,906,655 A | 5/1999 | Fan | |
| 6,148,261 A | 11/2000 | Obradovich et al. | |
| 6,167,277 A | 12/2000 | Kawamoto | |
| 6,414,630 B1 | 7/2002 | Usui | |
| 6,999,779 B1 | 2/2006 | Hashimoto | |

FOREIGN PATENT DOCUMENTS

| | | |
|---|---|---|
| EP | 0 528 090 | 2/1993 |
| EP | 0 601 293 | 6/1994 |
| EP | 0766095 | 9/1996 |
| EP | 0 766 096 | 4/1997 |
| GB | 1 528 180 | 10/1978 |
| GB | 2025185 | 1/1980 |
| GB | 2 283 873 | 5/1995 |
| JP | 63-292790 | 11/1988 |
| JP | 1-42899 | 6/1989 |
| JP | 1-142899 | 6/1989 |
| JP | 02-050298 | 2/1990 |
| JP | 7-332993 | 12/1991 |
| JP | 4-122873 | 4/1992 |
| JP | 4-256992 | 9/1992 |
| JP | 5-205174 | 8/1993 |
| JP | 06-102050 | 4/1994 |
| JP | 6-291716 | 10/1994 |
| JP | 6291716 | 10/1994 |
| JP | 6-331367 | 12/1994 |
| JP | 7-159193 | 6/1995 |
| JP | 7-20011 | 8/1995 |
| JP | 7-209011 | 8/1995 |
| JP | 7-280583 | 10/1995 |
| JP | 8-037682 | 2/1996 |
| JP | 3026539 | 4/1996 |
| JP | 08-150125 | 6/1996 |
| JP | 8-211827 | 8/1996 |
| JP | 8-212497 | 8/1996 |
| JP | 8-293829 | 11/1996 |
| JP | 8-305285 | 11/1996 |
| JP | 9-018427 | 1/1997 |
| JP | 10-103993 | 4/1998 |
| JP | 10-281801 | 10/1998 |
| JP | 2003-281694 | 3/2003 |
| WO | 83/02501 | 7/1983 |
| WO | 92/13284 | 8/1992 |
| WO | 94/15412 | 7/1994 |
| WO | 95/17685 | 6/1995 |
| WO | 95/27219 | 10/1995 |
| WO | 97/01104 | 1/1997 |

OTHER PUBLICATIONS

Japanese Office Action for corresponding application No. H10-022996.
Notice of Rejection Grounds, dated May 19, 2004.
Office Action for corresponding Chinese Application No. 03101019.9 dated May 13, 2005.
Office Action for corresponding Chinese Application No. 03101018.0 dated May 13, 2005.
Office Action for corresponding Chinese Application No. 03101017.2 dated May 13, 2005.
Communication (Notice of Rejection Grounds) for corresponding Japanese Application No. 2004-114174 dated Jul. 5, 2005.
Notice of Rejection Grounds for corresponding Japanese Application No. 2004-114174 Mailed Jan. 24, 2006.
Japanese Office Action mailed Jun. 19, 2007 in corresponding Japanese Application No. 2005-257130.
Japanese Office Action mailed Jun. 19, 2007 in corresponding Japanese Application No. 2006-058112.
Office Action issued in corresponding Japanese Patent Application No. 2005-257130, mailed on Feb. 12, 2008.
Japanese Patent Office Communication dated May 19, 2009 in corresponding Japanese Application No. 2006-58112.
U.S. Appl. No. 11/244,003, filed Oct. 6, 2005, Ken Hashimoto, Fujitsu Limited.
Communication issued by the Japanese Patent Office on Sep. 29, 2009 in the related Japanese Application No. 2006-58112.
Official Communication issued by the Japanese Patent Office on Feb. 2, 2010 in the corresponding Japanese patent application No. 2006-58112.

* cited by examiner

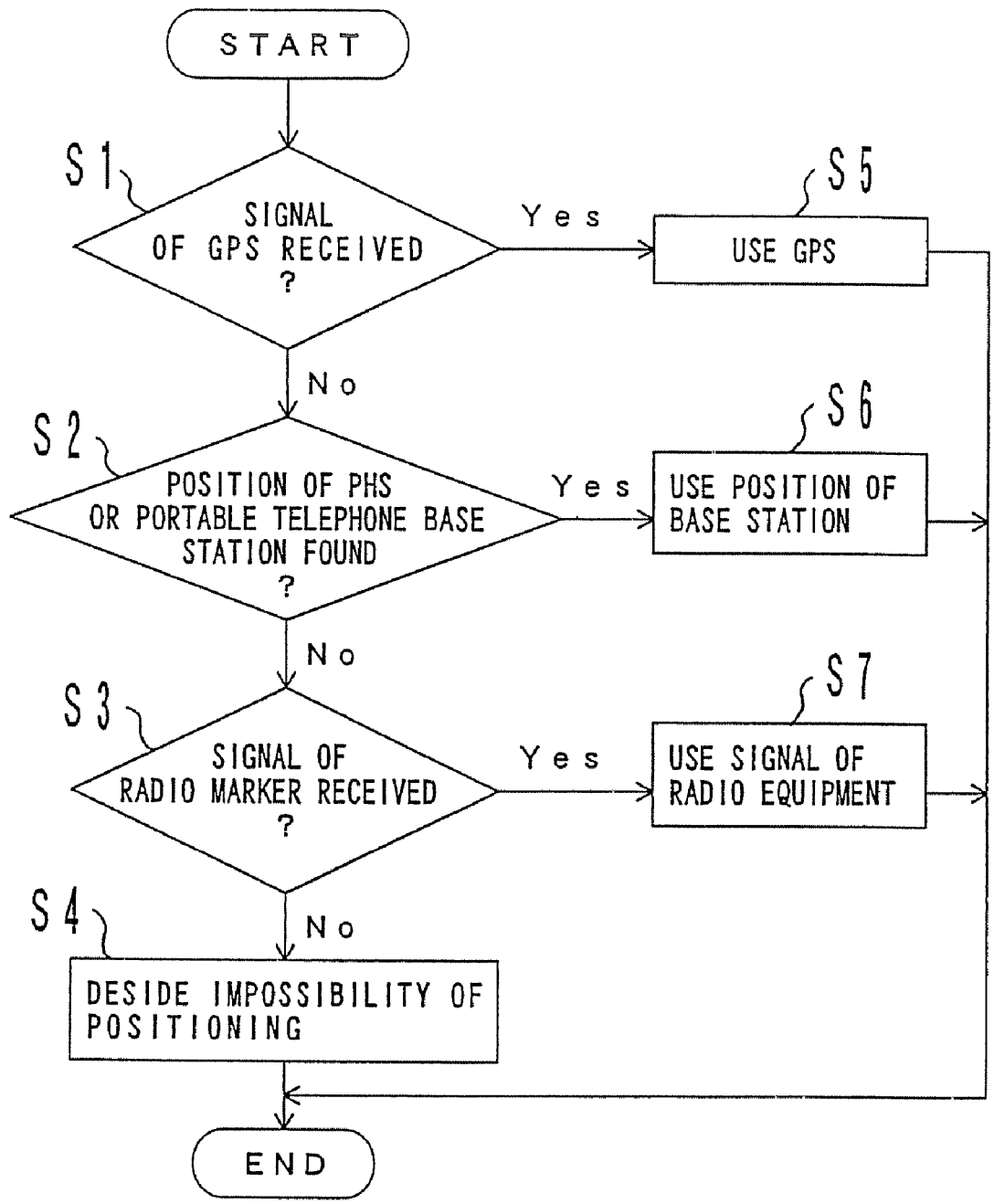
F I G. 2

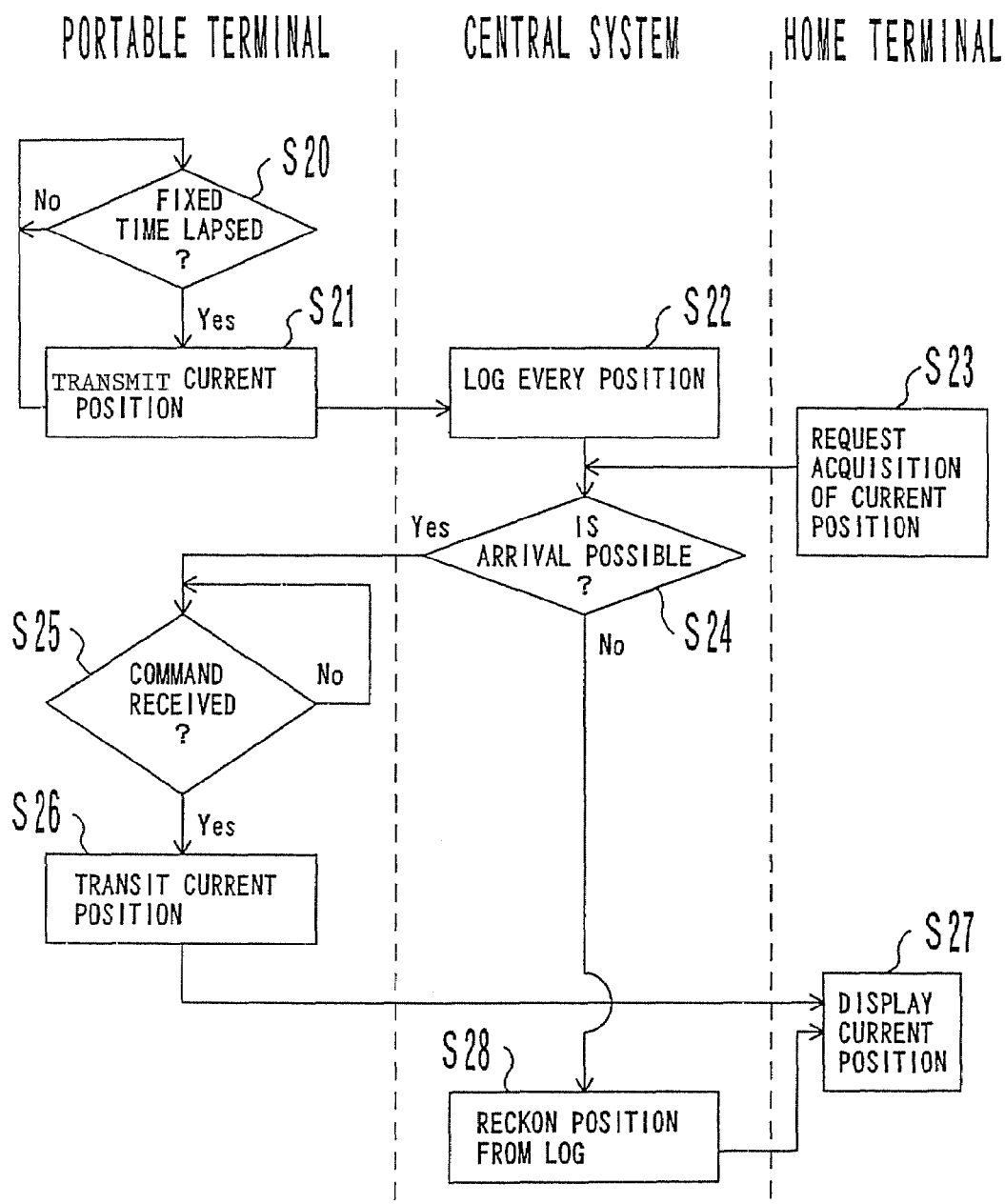
F I G. 5

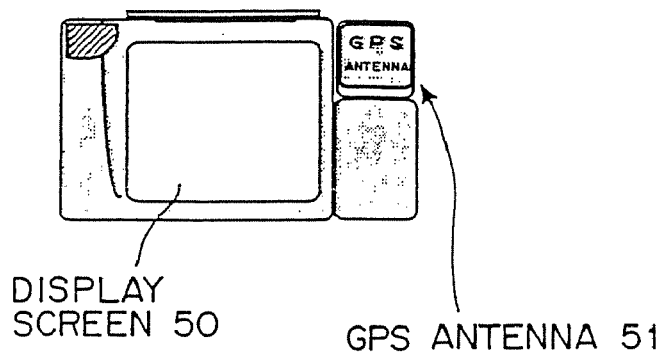
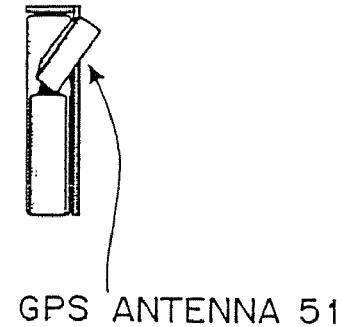
FIG. 10A
FIG. 10B
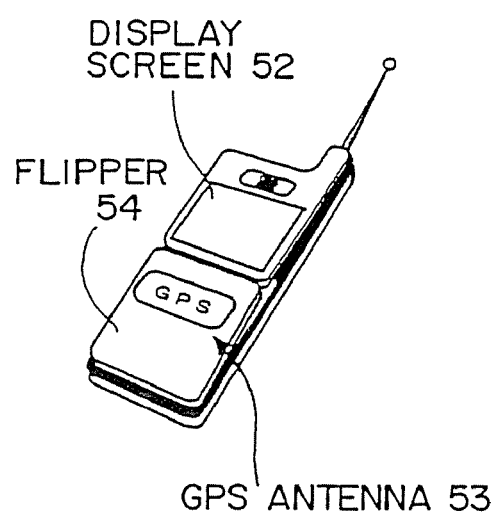
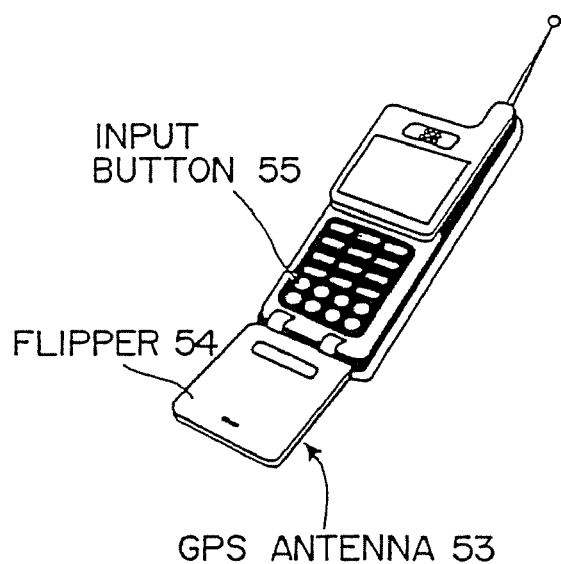
FIG. 10C
FIG. 10D

POSITION INFORMATION MANAGEMENT METHOD AND APPARATUS

CROSS REFERENCE TO RELATED APPLICATION

This application is a continuation of application Ser. No. 11/244,003 filed Oct. 6, 2005, now pending, which is a continuation of application Ser. No. 08/902,153, now U.S. Pat. No. 6,999,779, filed Jul. 29, 1997, the entire contents both of which are incorporated by reference herein.

BACKGROUND OF THE INVENTION

1. Field of the Invention

The present invention relates to a position information management system, and more particularly to a system for managing the position information of pedestrians.

2. Description of the Related Art

Nowadays, a car navigation system wherein a terminal is mounted in an automobile so as to display the current position of the automobile has been put into practical use and put on the market. According to the car navigation system, anybody can reach a destination without getting lost even in an area which he/she visits for the first time, because the map of his/her surroundings is displayed with the current position.

The car navigation system executes the processing of receiving radio waves from satellites so as to acquire the current position in terms of a latitude and a longitude, and reading out map information which contains the acquired latitude and longitude, from a memory device.

Such car navigation operates to navigate the driving of the automobile. There has also been developed and put on sale a system wherein a person holds or carries a terminal of a portable type, on which his/her current position and pertinent map information are displayed so as to navigate the person.

The personal navigation system also executes the processing of receiving radio waves from satellites so as to acquire the current position in terms of a latitude and a longitude, and displaying the stored map information with the current position.

The system wherein the current position is determined by receiving the radio waves from the satellites in this manner, is called the "GPS (Global Positioning System)".

Meanwhile, in the navigation system as stated above, the current position is acquired by catching the radio waves from the satellites. Therefore, the system has the disadvantage of failing to operate in a location where the radio waves cannot be received from any of the satellites.

Besides, in the system for navigating the movements of a person, the terminal to be held or carried by the person tends to be somewhat large in size because a CD-ROM or the like for storing map information is built therein.

SUMMARY OF THE INVENTION

An object of the present invention is to provide a position information management system of higher serviceability.

According to the present invention, in a system wherein information from a positioning system is acquired in an information terminal and is processed in a central system so as to manage information on a position of the information terminal, a position information management system is characterized by employing an information terminal which is adapted to utilize a plurality of kinds of positioning systems and to automatically change from any of the positioning systems in an unavailable state, to an available one of the positioning systems, so as to acquire a current position thereof by the use of the available positioning system.

Further, an information terminal for use in the present invention is one which can communicate with a central system for managing position information, and which acquires information from a positioning system so as to display information on a position of the information terminal, and is characterized by being adapted to utilize a plurality of kinds of positioning systems, and to automatically change from any of the positioning systems in an unavailable state, to an available one of the positioning systems, so as to acquire a current position of the information terminal by the use of the available positioning system.

Alternatively, a portable radio terminal in the present invention is characterized by comprising position information acquisition means for obtaining current position information; and means for transmitting the position information obtained by the position information acquisition means, to another equipment through a radio channel, in compliance with a request for the position information made through the radio channel by the other equipment.

In another aspect, a portable radio terminal is characterized by comprising position information acquisition means for obtaining current position information on the basis of a radio wave from a satellite; means for connecting the portable radio terminal through a radio channel with a center which manages current position information of a plurality of portable radio telephone terminals; means for registering the current position information obtained by the position information acquisition means in the center through the connection means; and means for acquiring a current position of the portable radio terminal of a third party from the center through the connection means.

In this way, according to the present invention, a navigation function etc. does not become unusable for the reason that any of the positioning systems is unavailable, and the position information can be acquired and displayed by any method without fail. Therefore, the position information management system is high in serviceability.

Especially, according to the present invention, the information terminal or portable terminal can comprise a direction detector for independently reckoning its own position. Thus, even in a case where the GPS and other positioning systems are not available at all, the navigation function can be utilized as long as merely a starting point is known.

Moreover, the portable terminal or information terminal is endowed with the function of retaining the minimum map data required of the terminal itself, in the form of an IC card, etc., whereby the number of times of downloading from the central system can be decreased. Also, the IC card is employed as a detachable storage medium, whereby the terminal itself can be made smaller in size than in case of employing a CD-ROM drive.

The system of the present invention can offer a large number of other services, which will be exemplarily described in conjunction with the drawings below.

BRIEF DESCRIPTION OF THE DRAWINGS

FIG. 2 is a flowchart of a system change over control process for acquiring position information, the control being performed by a controller (22) shown in FIG. 1;

FIG. 5 is a flowchart showing the general process of an inquiry system for inquiring about the position of the holder of a portable terminal, the inquiry system utilizing the system of the present invention;

FIGS. 10A-10D are views showing examples of the external appearances of the respective portable terminals of the present invention.

DESCRIPTION OF THE PREFERRED EMBODIMENTS

Figure 1:
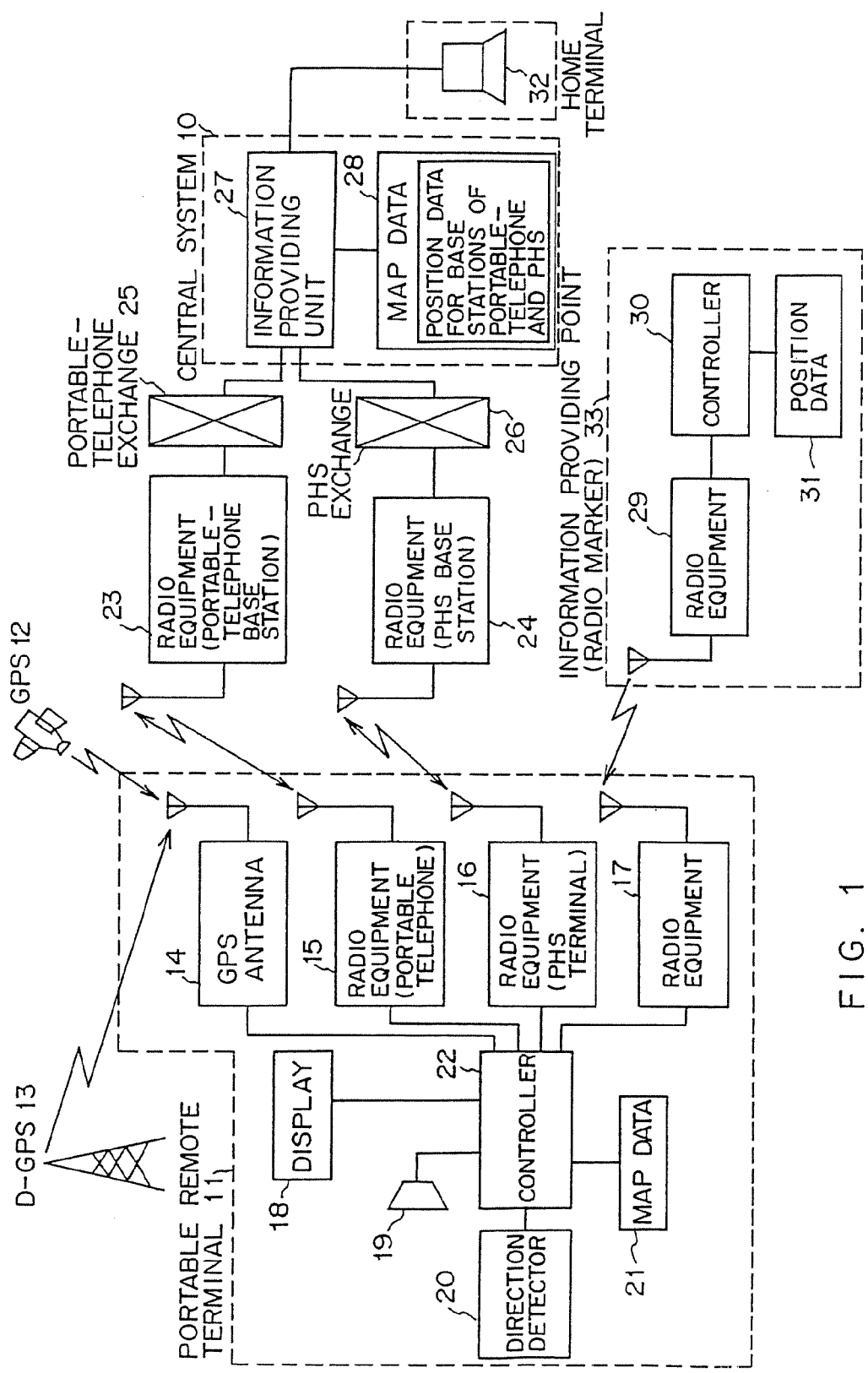
FIG. 1 is a block diagram showing the system architecture of a position information management system according to the present invention.

FIG. 1 is a block diagram showing the system architecture of a position information management system embodying the present invention.

The system of the present invention comprises a central system 10 which manages information in unified fashion, a portable remote terminal 11 which is carried by a person, a satellite 12 which serves for a GPS, a radio wave transmission tower 13 which serves for a D-GPS (Differential GPS), and an information offer point (radio marker) 33 which determines the position of the portable terminal 11 by radio waves.

The portable terminal 11 includes the respective receivers of a GPS antenna 14, radio equipment 15 for a portable telephone, radio equipment 16 for a "PHS", and radio equipment 17 for receiving radio waves from the radio marker 33. The respective receivers receive radio waves from corresponding radio-wave transmission stations, and deliver them to a controller 22. (Incidentally, the initials "PHS" stand for "Personal Handy-phone System" which is a digital type of mobile terminal communications system standardized in Japan and some other countries. Hereinafter we refer mainly to PHS, but the present invention is not restricted to PHS, instead any type of digital type mobile terminal communications system can be applicable).

The controller 22 acquires the current position of the portable terminal 11 by the use of the highest precision of position information among position information items obtained from the respective radio waves, and it lets the holder of the portable terminal 11 know the acquired current position by supplying a display unit 18 with the current position and a map of the surrounding area. Numeral 19 indicates a speaker, which is used in the case of sounding an alarm to the holder of the portable terminal 11. In the portable terminal 11, the minimum map information, such as the map information of a district to which the holder often goes, is stored as map data 21. In a case where the portable terminal 11 lies within the limits of the map data 21, the controller 22 reads out the map data 21 and delivers it to the display unit 18. Further, the map data 21 stored in the portable terminal 11 should preferably be realized by mounting a detachable storage medium such as an IC card or miniature card. Thus, only the minimum map data of the zone where the holder wants to move need be installed, and an unnecessarily large storage capacity is not required. The embodiment therefore has the advantage that the portable terminal 11 can be reduced in size.

A direction detector 20 in the portable terminal 11 serves to independently detect the movement of the portable terminal 11 and specify the current position thereof in a case where none of the radio waves has arrived at the portable terminal 11. The direction detector 20 includes a gyrocompass and an acceleration sensor. The controller 22 calculates the moving direction and moved distance of the portable terminal 11 by processing information from the direction detector 20, and it outputs the resultant current position to the display unit 18. Particularly in a case where a three-dimensional gyro is employed and where acceleration sensors are arranged in three dimensions, the moving direction and moved distance of the portable terminal 11 in three dimensions can be calculated. In this case, therefore, the portable terminal 11 can effect navigation independently in the situation where none of the radio waves can be received.

The central system 10 is connected to radio equipment (a portable-telephone base station) 23 through a portable-telephone exchange 25 and also to radio equipment (a PHS base station) 24 through a PHS exchange 26, and it provides the exchange of position information with the portable terminal 11, etc. An information providing unit 27 in the central system 10 retains map data 28 which contains the position data of the portable-telephone and PHS base stations 23 and 24. In a case where the map data 21 retained in the portable terminal 11 is insufficient to display the current position, the central system 10 sends the map data 28 to the portable terminal 11 so as to permit the display of the current position. The position data of the portable-telephone or PHS base stations 23 or 24 respectively is used when the portable terminal 11 has to find its position from the site of the nearest portable-telephone base station 23 or PHS base station 24 for the reason that the radio waves from the GPS 12 and the D-GPS 13 are not receivable.

In addition, the information providing unit 27 is connected with a home terminal 32 through a network or the like. Thus, it offers the position information of the portable terminal 11 in order to locate, for example, an old person or a child, who holds the portable terminal 11.

The information providing point (radio marker) 33 is used in order that the portable terminal 11 may acquire the current position in the case where signals from the GPS 12, D-GPS 13, portable-telephone base station 23 and PHS base station 24 are not available. The information offer point 33 includes radio equipment 29, a controller 30 and position data 31. The position data 31 is the stored data of a latitude and a longitude where the information offer point 33 is disposed, and it is transmitted from the radio equipment 29 to the portable terminal 11 through the controller 30. On the side of the portable terminal 11, the current position thereof is acquired on the basis of the latitude and longitude information transmitted from the information offer point 33.

FIG. 2 is a flowchart showing a system changeover control process for the acquisition of the position information as performed by the controller 22 depicted in FIG. 1.

The portable terminal 11 can acquire the position information by using any of the GPS, portable telephone, PHS and radio marker systems. The precision of the position information decreases in the order of the position information from the GPS 12, those from the portable-telephone base station 23 and the PHS base station 24, and that from the radio marker 33. Therefore, the positioning systems or devices are automatically changed over successively toward those of lower precisions in such a manner that the GPS is used first for the acquisition of the current position, and then the second highest precision system is used if the GPS is unavailable.

At step S1 in FIG. 2, whether or not the signal from the GPS is being received is first determined. If the signal from the GPS is receivable, the position of the portable terminal (11 in FIG. 1) is determined using the GPS (step S5).

If the signal from the GPS is not receivable at the step S1, the flow of the control process advances to step S2, which serves to judge whether or not the position of the base station of the PHS or portable telephone system is available. The position of the base station of the PHS or portable telephone system can be obtained in such a way that a signal is transmitted from the portable terminal to the nearest base station, that the base station having received the signal transmits a signal to the central system 10, and that the central system at which the signal from the base station has arrived sends the position of the base station having received the transmitted signal from the portable terminal, back to the portable terminal. The position of the base station nearest to the portable terminal is regarded as the position of the holder of the portable terminal upon the determination that the person holding the portable terminal lies in the vicinity of the position of the base station.

Accordingly, in a case where the position of the base station of the PHS or portable telephone system is found at step S2, the position of the portable terminal or the holder thereof is acquired using the base station, as stated above, at step S6.

In a case where the position of the base station of the PHS or portable telephone system is not found at step S2, as in the case where telephonic communication is impossible outside the service areas of the PHS and portable telephone system, whether or not the signal from the radio marker 33 can be received is judged at step S3. Radio markers are disposed at each of the main or important spots of a town, and generate a radio signals indicative of the latitude and longitude of the corresponding spot.

If the portable terminal can receive the radio wave from the radio marker, the signal from the radio marker received by the radio equipment 17 is used at step S7. More specifically, the current position of the portable terminal or the holder thereof is regarded as being substantially identical to the latitude and longitude of the nearest radio marker, and is displayed on the display unit 18 as such.

However, if the radio wave from the radio marker is not receivable at step S3 either, the positioning is regarded as being impossible, and a display is presented to the holder to that effect (step S4).

In the case where the positioning is determined to be impossible at step S4, the direction detector 20 in FIG. 1 is used for calculating the moving direction and moved distance from the site where the position of the portable terminal was measured last. The current position of the portable terminal is reckoned on the basis of the calculated moving direction and moved distance, and is displayed on the display unit.

Figure 3:
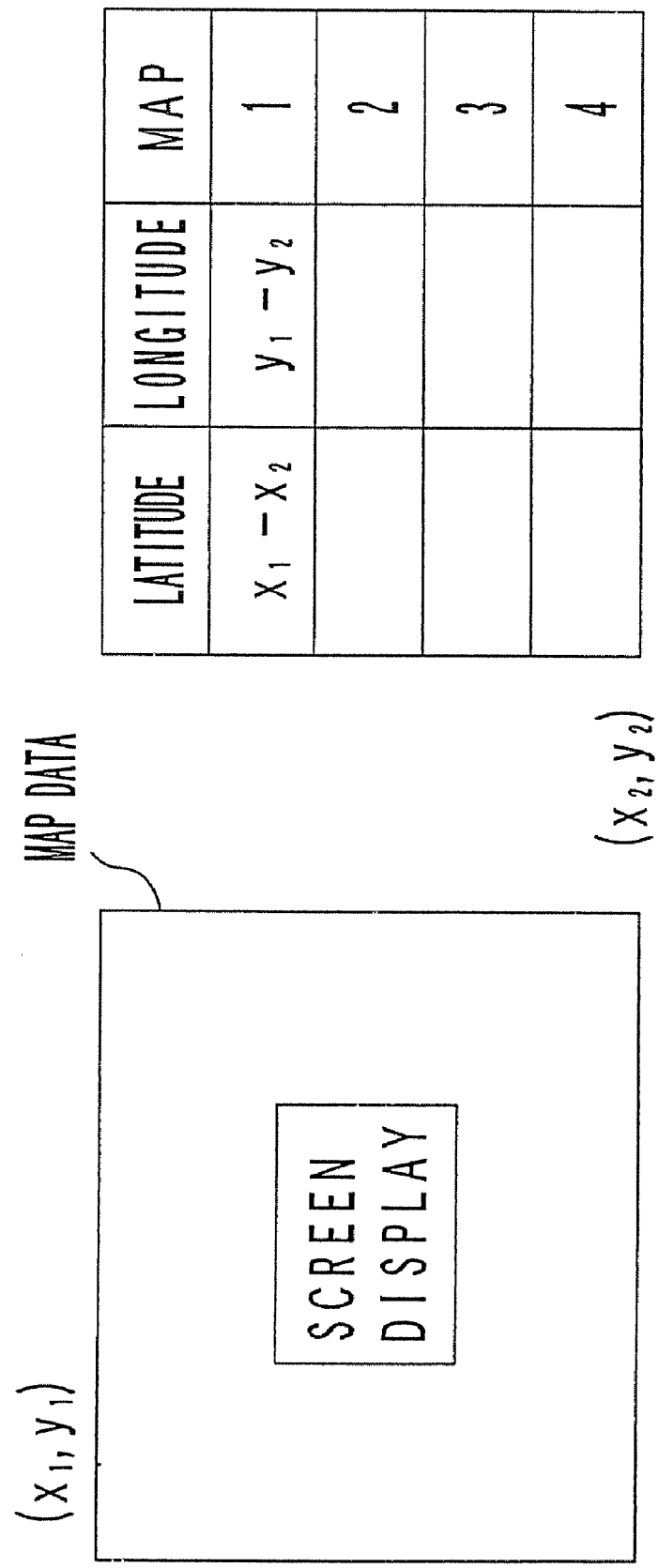
FIG. 3 is a diagram showing the relationship between map data to be displayed on a portable terminal and the display screen of a display unit.

FIG. 3 illustrates the relationship between the map data to be displayed on the portable terminal 11 (shown in FIG. 1) and the display screen of the display unit 18.

The left part of FIG. 3 illustrates the relationship between a screen display actually presented and the acquired map data. The map data includes data retained in the portable terminal and data downloaded from the central system 10. The map data items are divided into blocks in accordance with predetermined latitudinal and longitudinal limits and are managed by affixing NoS. to the respective blocks, as shown at the right part of this figure.

By way of example, in the case shown in FIG. 3, the map data in a range which is larger than the actual display screen is loaded for display, and the range defined by (x.sub.1, y.sub.1) and (x.sub.2, y.sub.2) in terms of latitudes and longitudes is displayed. As seen in the table at the right part of FIG. 3, the loaded map data corresponds to map No. 1. Herein, the latitudinal limits are from x.sub.1 to x.sub.2, while the longitudinal limits are from y.sub.1 to y.sub.2.

When the latitude and longitude of the portable terminal at the current time have been found, the table as shown at the right part of FIG. 3 is referred to, and the map data whose latitudinal and longitudinal limits embrace the current latitude and longitude of the portable terminal is loaded.

When the current position of the portable terminal has changed up to the end of the loaded map data, the next map is loaded. The map data items are set so that the peripheral edges of the maps overlap each other, and at least two map data items contain the latitude and longitude of a current position near the end of the map data. In a case where the current position is near the end of the map data and where either of the map data items to be loaded is not definite, the direction in which the holder of the portable terminal has proceeded or moved till then is computed, and a map ahead in the proceeding direction is loaded. Further, in a case where the position of the portable terminal, is already at the end of the map data at the time of the turn-ON of the power source of the portable terminal, and where the proceeding direction of the holder till then is unknown, it is possible, by way of example, that a map of smaller number is once loaded so as to acquire the proceeding direction, whereupon the next map of an adjacent zone is loaded as may be needed.

Incidentally, the map data need not always be prepared so as to cover a range larger than the display screen as exemplified in FIG. 3, but the map of the zone which the display screen covers may well be displayed by managing in smaller divided regions beforehand and joining a plurality of map data items so as to output the joined map data items to the display screen. Also in this case, the map data with the plurality of map data items joined together is set to be somewhat larger than the display screen, and new map data is loaded on occasions as the position of the holder of the portable terminal changes.

Figure 4:
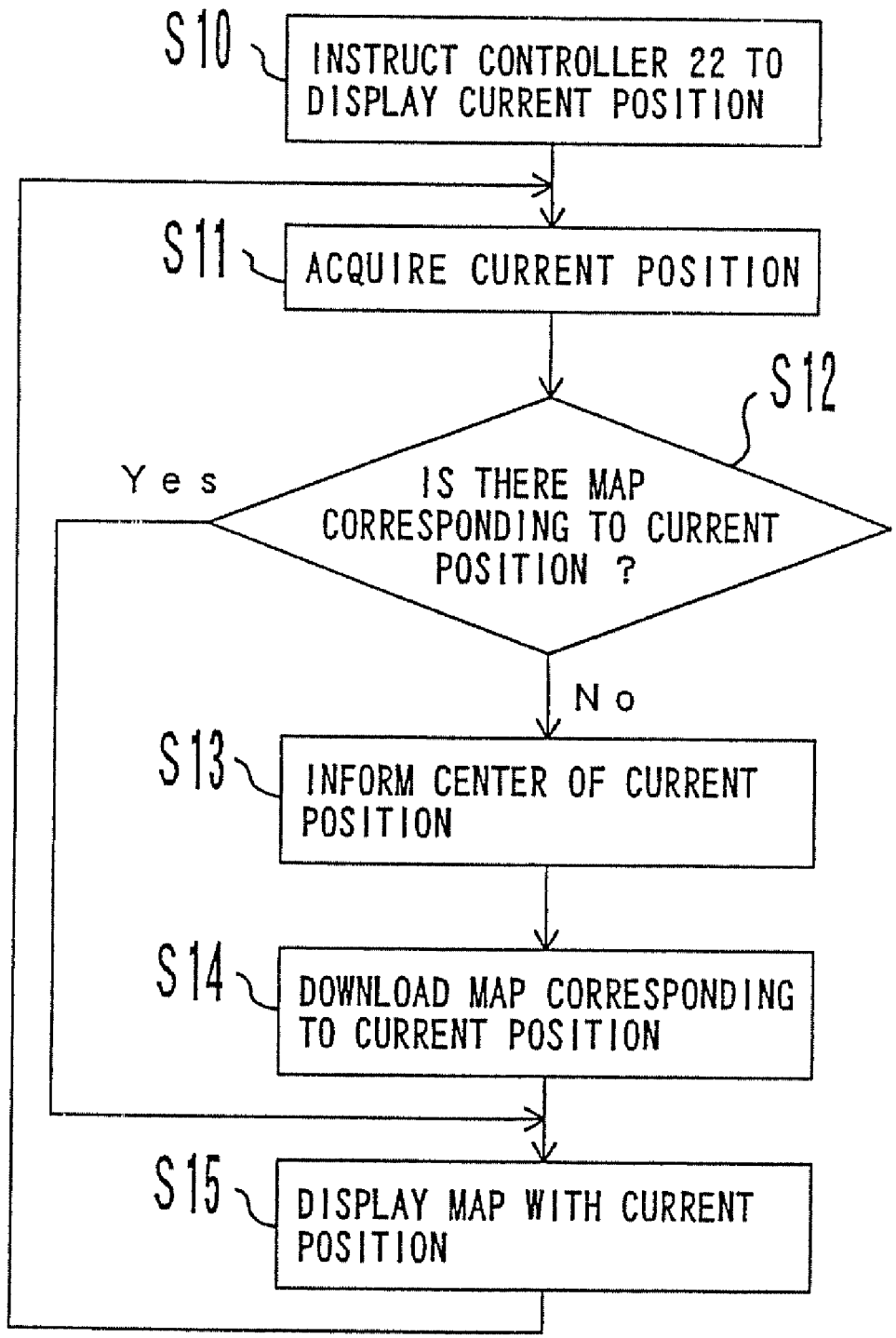
FIG. 4 is a flowchart in the case of acquiring a current position and then displaying a map.

FIG. 4 is a flowchart showing a processing flow in the case of acquiring the current position and displaying a map.

The map data display flow in the figure is performed by the controller 22 of the portable terminal 11. First, the user of the portable terminal 11 instructs the controller 22 to display the current position thereof at step S10. Then, the current position is obtained from the GPS at step S11. Here, as described with reference to FIG. 2, in the case where the current position cannot be obtained with the GPS, it is obtained on the basis of the position of a base station of the PHS or portable telephone systems. Further, in the case where the position of such a base station is unavailable, the radio marker is utilized. Still further, in the case where the radio marker cannot be utilized, the direction detector 20 of the portable terminal 11 is used for calculating the proceeding direction and moved distance of the holder and for estimating the current position from the last position information obtained. On this occasion, a display is presented to the effect that the current position cannot be acquired and is being estimated by the direction detector 20.

When the current position has been acquired at step S11, the next step S12 is executed to judge whether or not a map containing the current position is included in the map data 21 stored in the portable terminal 11. On condition that the map containing the current position is included in the map data 21 stored in the portable terminal 11, the flow advances to step S15, at which the map is displayed together with the current position.

In contrast, if the map containing the current position is not included in the map data 21 stored in the portable terminal 11, the controller 22 notifies the central system 10 of the current position at step S13. In the central system 10, the map data containing the received current position is searched for. The portable terminal 11 downloads the map data containing the current position from the central system 10 (step S14). At step S15, the map is displayed on the display unit 18 of the portable terminal 11, and the current position is simultaneously displayed in the map. The downloaded map data is stored in a memory as the map data 21 of the portable terminal 11. Thereafter, the flow returns to step S11, and the acquisition of the current position and the display of the map as well as the current position are continued.

The operation of displaying the current position may well be terminated by, for example, providing a display termination button in the portable terminal 11 beforehand and interrupting the flow of FIG. 4 subject to a depression of the button. Alternatively, the display operation may well be terminated by directly turning OFF the power source of the portable terminal 11.

Incidentally, in the case of acquiring the map data, it is not efficient to download the frequently used map data each time. Therefore, in addition to the map number and the latitude as well as the longitude, the number of times of display on the display screen and the date and time of the most recent access are recorded together in the map data 21 which is retained in the portable terminal 11. The map data is retained in the portable terminal 11 for a predetermined time period, and the map data for which a predetermined time period has expired since the date and time of the most recent access is erased on account of the limited storage capacity. Accordingly, the map data displayed in excess of a preset number of times during the predetermined time period is retained without being erased, by referring to the number of times of display on the display screen. In this way, frequent downloading of the same map data is avoided, and the storage capacity of the portable terminal 11 can be effectively used.

FIG. 5 is a flowchart showing the general process of an inquiry system for inquiring about the position of the holder of the portable terminal.

The inquiry system is realized by utilizing the system of the present invention. It can be applied to a person, such as an old person, whose destination is unknown and whose actions need to be supervised. Accordingly, it can be used for the supervision of the action of not only an old person, but also a child.

First, the portable terminal 11 (as shown in FIG. 1) regularly acquires the current position at every fixed time period by the use of the GPS etc. in order to find its position at the current time. Accordingly, whether or not the fixed time period has lapsed is judged as indicated at step S20, and the portable terminal transmits the acquired current position to the central system 10 at step S21.

In the central system, each time the current position sent from the portable terminal is received, it is logged (step S22). Thus, the path which the holder of the portable terminal has followed is known at anytime.

Here, in the case where the holder is not acquiring the current position on the portable terminal side, the process of issuing a call from the central system side to the portable terminal 11 is executed, so as to acquire the current position (polling).

When the user of the home terminal 32 needs to know where the holder of the portable terminal 11 is now, he/she requests the central system to report the position of the holder of the portable terminal (step S23). Herein, the holder of the portable terminal is identified by an ID No., telephone No. or the like, of the portable terminal. Upon receiving the request for the acquisition of the current position from the home terminal, the central system judges whether or not the call can arrive at the portable terminal (step S24). Whether or not arrival is possible, is judged depending upon whether or not the portable terminal has sent a response signal in reply to a call signal transmitted from the central system.

In the case where the arrival has been judged impossible at step S24, the central system deduces the speed and direction of the portable terminal from the path thereof till now, and estimates the current position of the portable terminal, with reference to the log, at step S28, and it operates so as to display the estimated position on the home terminal (step S27). On this occasion, a display is also presented to the effect that the arrival of the call at the portable terminal is impossible. Thus, the user of the home terminal understands that the displayed position is an estimated one.

On the other hand, in the case where the arrival of the call has been judged possible at step S24, the central system commands the portable terminal to transmit a signal indicative of its current position. When the portable terminal receives the command (step S25), it transmits a signal of the current position to the home terminal through the central system (step S26). In the home terminal, the current position of the signal which has been sent from the portable terminal to this home terminal through the central system can be observed on a display unit (step S27).

Incidentally, a method of estimating the current position of the portable terminal in the central system may be as follows, by way of example:

In such a case where, during the movement of the holder of the portable terminal over a long distance by some means of transport, the moving direction and speed of the portable terminal can be estimated by extrapolation of GPS signals received infrequently near a window or GPS signals received on the occasion of transferring, and the current position can be estimated from the moving direction and speed in spite of the situation where GPS signals are not always able to be received.

Alternatively, in such a case where, during the movement of the holder in an automobile, the moving direction and speed of the portable terminal can be computed even with the intermittent reception of GPS signals similarly to the above case, and the current position can be predicted according to its trend or general area as in the conjecture of the course of a typhoon in a weather forecast, from the moving direction and speed, in spite of the situation where GPS signals are not always able to be received.

In this way, the supervisor who uses the home terminal can easily monitor the current position of the holder of the portable terminal merely by causing the old person or the child to carry the portable terminal. Therefore, the inquiry system can be used as a supervisory system very effectively.

Figure 6:
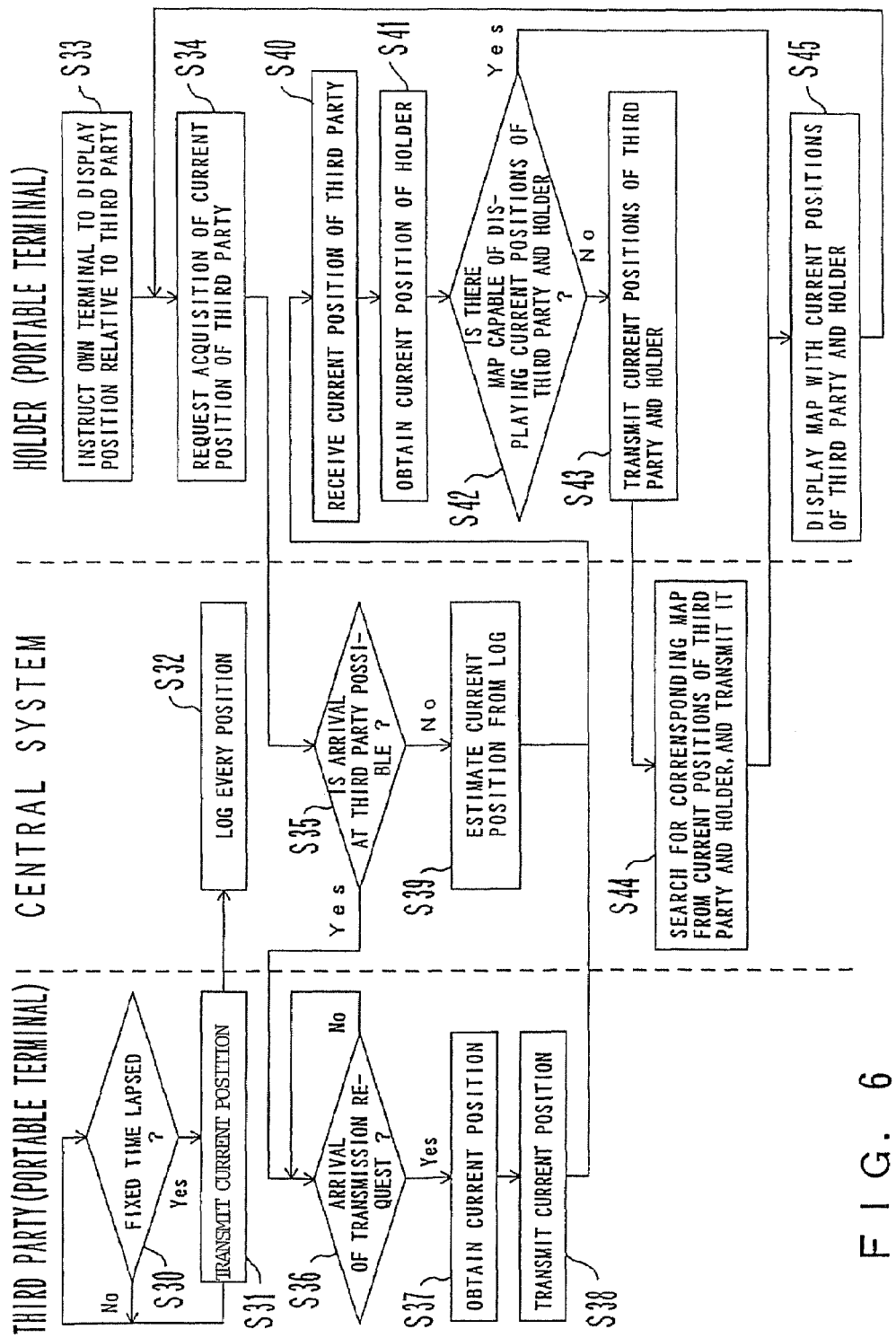
FIG. 6 is a flowchart showing processes in the case where the system of the present invention is applied to the position information acquisition between portable terminals.

FIG. 6 is a flowchart showing processes in the case where the system of the present invention is applied to the acquisition of position information between portable terminals.

The system shown in FIG. 5 corresponds to the case where the position information of the portable terminal is acquired by the home terminal. In contrast, in the example of the application shown in FIG. 6, the position information items are acquired between portable terminals 11 (as shown in FIG. 1), so that the holders of the portable terminals can mutually know where the other holders are.

In the flow of the processes illustrated in FIG. 6, it is assumed that a specific holder of a portable terminal 11 wants to know the current position of another holder who is set as a third party, and that he/she displays the position of the third party on the display unit 18 of his/her own portable terminal 11 through the central system 10.

First, the portable terminal carried by the third party is continually acquiring its current position by the use of the GPS, PHS, portable telephone system or radio marker. Further, in this portable terminal, whether or not a fixed time period has lapsed is judged (step S30), and the acquired current position is transmitted to the central system for each fixed time period (step S31). In the central system, the current position sent from the third party is logged (step S32), and the path of movement which the third party has followed is known anytime. Here in the flowchart of FIG. 6, the step of transmitting the current position to the central system is not mentioned on the side of the specific holder carrying a portable terminal 11 of the same construction. The reason, therefore, is that only the processes for knowing the current position of the third party by the specific holder are described. In practice, the portable terminal of the specific holder also transmits its current position to the central system every fixed time period, and the changes of its current position are also logged in the central system. Accordingly, the processes in FIG. 6, which are executed by a specific holder, can be similarly executed toward the specific holder by the third party.

The specific holder who wants to know the current position of the third party, instructs his/her own portable terminal to display its position relative to the third party (step S33). Thus, the portable terminal of the specific holder requests the central system to acquire the position of the third party (step S34). On this occasion, the specific holder needs to identify the third party, and the ID No., telephone No. or the like of the third party portable terminal is utilized for the identification. Upon receiving the request for the acquisition of the current position of the third party from the specific holder, the central system checks whether or not a call can arrive at the portable terminal of the identified third party (step S35). As stated before, whether or not the arrival is possible is checked depending upon whether or not the portable terminal of the third party responds to a call signal transmitted from the central system.

In the case where the arrival is impossible, the central system examines the speed and proceeding direction of the identified third party by the changes from the current position previously logged, and thereby estimates the current position of the third party (step S39), and it transmits a signal indicative of this estimated position to the portable terminal of the specific holder. The portable terminal of the specific holder receives the signal (step S40), and it subsequently acquires its own position by the use of the GPS, the base station of the PHS or portable telephone system, or the radio marker (step S41). The ensuing steps will be explained later.

On the other hand, in a case where the arrival at the third party is possible, the central system requests the portable terminal of the third party to transmit a signal indicative of its current position (step S36). The portable terminal of the third party acquires its current position by the use of any of the GPS, PHS, portable telephone system and radio marker (step S37), and it transmits the signal of its current position to the central system (step S38). The central system transmits the signal of the current position of the third party to the portable terminal of the specific holder. Thus, the portable terminal of the specific holder receives the signal of the current position of the third party (step S40), and it subsequently acquires its own current position (step S41).

In the case where the current position of the third party has been found by the transmission from the third party or by the estimation in the central system, and where the current position of the specific holder himself/herself has been found, the controller 22 judges whether or not a map capable of displaying both the positions of the third party and the specific holder is included in the map data 21 stored in the portable terminal of the specific holder (step S42). In the case where the map data capable of such display is stored, it is displayed, and the positions of the specific holder and the identified third party are displayed on the map (step S45).

After the termination of the display operation, the processing flow in the portable terminal of the specific holder is returned to step S34 so as to repeatedly acquire and display the current positions of the third party and the specific holder himself/herself, for the purpose of continually displaying the relative positions.

On the other hand, in the case where the map adapted to display the positions of the identified third party and the specific holder is not included in the map data stored in the portable terminal of the specific holder, this portable terminal transmits a signal indicative of the current positions of the third party and the specific holder to the central system (step S43). The central system searches for the map data capable of displaying both the positions of the third party and the specific holder simultaneously, on the basis of the signal of the current positions of the third party and the specific holder, and it transmits the map data capable of displaying both the positions simultaneously, to the portable terminal of the specific holder (step S44). In the portable terminal of the specific holder, the map data sent thereto from the central system is displayed, and the positions of the third party and the specific holder are displayed thereon (step S45).

In this manner, with the system of the present invention, the position of the third party who is to be sought out can be known, not only with the home terminal, but also with a portable terminal, and locating an old person or a child actually being searched for can be assured. Accordingly, the search for an old person or a child can be efficiently carried out.

Figures 7A, 7B:
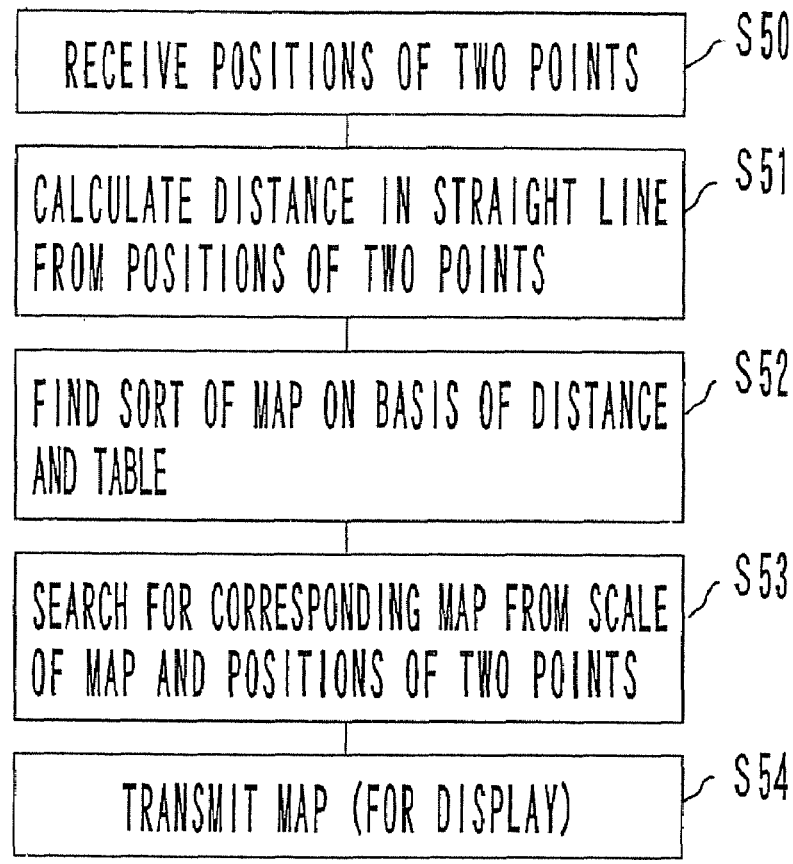
FIGS. 7A and 7B are diagrams for explaining the process of a central system among the processes shown in FIG. 6.

FIGS. 7A and 7B are diagrams for explaining processes which the central system executes in the processing flow of FIG. 6.

The flowchart of FIG. 7A illustrates the processes which the central system 10 (as shown in FIG. 1) executes in the case where the current positions of the third party and the specific holder have been transmitted thereto from the portable terminals 11.

Upon receiving the current positions of the two points locating the third party and specific holder (step S50), the central system calculates the distance in a straight line between the two points, from the positions of the two points (step S51). When the straight line distance between the two points has been evaluated, the suitable scale of a map is determined with reference to a table as shown in FIG. 7B (step S52). A map containing the two points is searched for from the determined scale of the map (step S53). Upon finding a map containing the two points, the central system transmits this map to the portable terminal having transmitted thereto the positions of the two points (step S54). In the portable terminal having transmitted the positions of the two points, a display is presented on the basis of the map data transmitted at step S54 by the central system.

FIG. 7B illustrates one example of a table which is used at the step S52 in FIG. 7A. In the illustration, the correspondence between the distance in a straight line and the sort of a map is not strictly appropriate, and FIG. 7B is presented just for explanation.

In the central system, a large number of scales of map data items are stored in order to cover various regions. In the example of FIG. 7B, maps in the four scale ranges of 1 to 10,000, 1 to 20,000, 1 to 50,000 and 1 to 100,000 are stored. The straight line distance signifies the distance between the two points for which the relative position is to be known, and it is indicated in units of kilometers.

In the example of FIG. 7B, when the straight line distance between the two points lies between 0 km and 100 km, the map of scale 1 to 10,000 is used. Upon reading from the table that a map of scale 1 to 10,000 is to be used in this manner, the central system searches for the map containing the transmitted current positions of the two points, from the map data of scale 1 to 10,000 in accordance with the latitudes and longitudes, and it transmits this map to the portable terminal, having already transmitted the straight line distance between the two points.

Whether or not both the two points are contained in an identical map is judged from latitudinal and longitudinal limits affixed to the map data. By way of example, as described with reference to FIG. 3, the map data consists of several individual map data items each of which covers predetermined limits, and each individual map data includes data which indicates the latitudinal and longitudinal limits covered by the map data itself. Accordingly, one of the individual map data items is first chosen, and it is judged whether or not the latitudes of the positions of the two points are contained in the latitudinal limits covered by the chosen map data item. If the latitudes of the positions of the two points are contained, it is subsequently judged whether or not the longitudes of the positions of the two points are contained in the longitudinal limits covered by the chosen map data item. In this way, whether or not the two points are contained in the single individual map data item can be judged.

The same applies to the maps of other scales. The table shown in FIG. 7B illustrates that, when the straight line distance between the two points is between 100 km and 200 km, the map data of scale 1 to 20,000 is searched for; that when the straight line distance is between 200 km and 500 km, the map data of scale 1 to 50,000 is searched for; and that when the straight line distance is 500 km or over, the map data of scale 1 to 100,000 is searched for. It is of course allowed to prepare map data items in scales different from the scales mentioned in the above example, and to register them in a table for use.

Figure 8A:
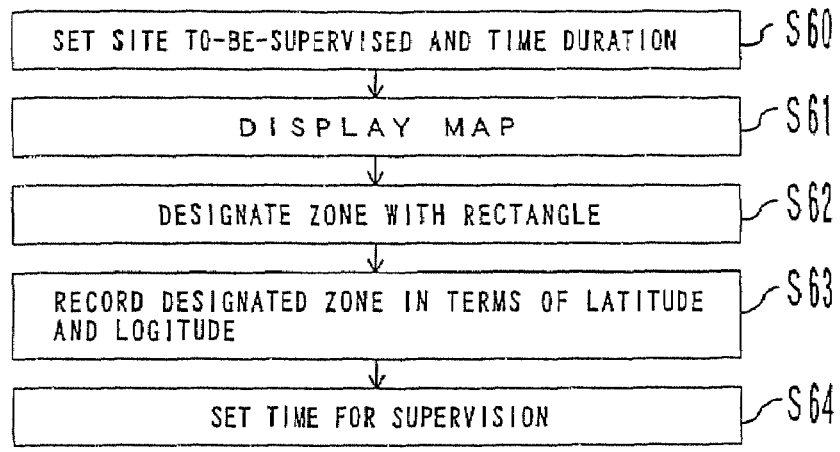
FIGS. 8A and 8B are flowcharts showing a process for supervising a third party on the side of a portable terminal.
Figure 8B:
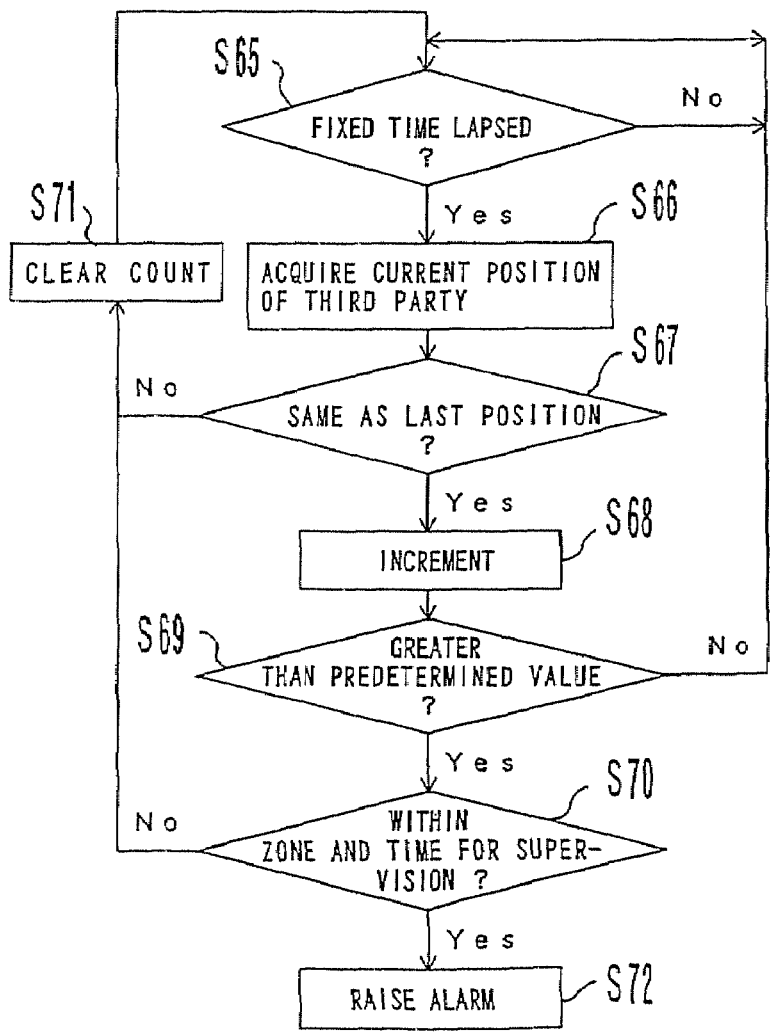

FIGS. 8A and 8B are flowcharts showing a process for supervising a third party on the side of a portable terminal.

FIG. 8A illustrates a processing flow for starting the supervisory process.

The user of the portable terminal 11 (as shown in FIG. 1) sets a site which is to be supervised and a time period during which the third party does not move, in order to set the instructions for supervising the actions of the third party on the portable terminal of the user (step S60). The site to-be-supervised may be designated either by a regional name or by a latitude and a longitude. In the case the site to-be-supervised is designated with the regional name, a table for associating regional names with the latitudinal and longitudinal limits of correspondent regions is prepared in the portable terminal beforehand. When any regional name has been input, the latitudinal and longitudinal limits of the correspondent region are acquired, and correspondent map data is searched for from within the map data 21 stored in the portable terminal or is downloaded from the central system 10.

When the corresponding map data has been obtained for the designated site to-be-supervised, it is displayed on the display unit 18 (step S61). The user further designates a zone to-be-supervised on the map displayed for specifying the site to-be-supervised, by enclosing the zone with a rectangle, by way of example (step S62). A designating method in the case of enclosing the zone with a rectangle may be, for example, one in which the display unit of the portable terminal is furnished with a touch screen beforehand, and in which the positions of the diagonal lines of the rectangle are designated by touching these positions with a pen or the like.

When the zone to-be-supervised has been designated by the rectangle, the latitudes and longitudes of the designated zone are acquired and recorded (step S63). Since the zone is designated on the map displayed on the display unit, the latitudinal limits and longitudinal limits of the designated zone can be easily acquired in such a way that the sides of the rectangle are formed in parallel with the lines of latitudes and longitudes on the map when the rectangle is depicted on the display, on the side of the portable terminal.

When the latitudes and longitudes of the designated zone have been acquired, a time period for the supervision is set (step S64).

FIG. 8B illustrates the flow of the process for supervising the action of the third party.

When the supervisory process has been started, it is first judged whether or not a fixed time period which is a time interval for acquiring the current position of the third party has lapsed (step S65). In a case where the fixed time period has not lapsed, the lapse of the fixed time period is awaited. On the other hand, in a case where the fixed time period has lapsed, the current position of the third party to-be-supervised is acquired (step S66). When the current position has been acquired, it is compared with the last position so as to judge whether or not it is the same as the last position (step S67).

If the acquired current position is not the same as the last position, a counter for counting a time period during which, or the number of times which, the third party was at an identical position (as are counted every predetermined time period) is cleared (step S71). In contrast, if the acquired current position is the same as the last position, the content of the counter for counting the time period during which, or the number of times which, the third party was at the identical position is incremented (step S68). After incrementing, it is judged whether or not the total of the counter has exceeded the predetermined value set initially (at the step S60 in FIG. 8A) (in step S69). In the case where the content of the counter is not greater than the predetermined value, the processing flow returns to the step S65 so as to continue the supervision.

On the other hand, in the case where the total of the counter is greater than the predetermined value, it is judged whether or not the third party to-be-supervised lies within the supervisory zone, and whether or not the current time falls within the supervisory time period (step S70). In the case where the third party does not lie within the supervisory zone or where the current time does not fall within the supervisory time period, the count value of the counter is cleared (step S71), and the processing is repeated from step S65. Besides, in the case where the third party lies within the supervisory zone and where the current time falls within the supervisory time period, it is decided that the third party to-be-supervised remains at the same site unnecessarily long, and that an abnormal situation may have occurred, and an alarm is raised (step S72).

The supervisory process thus far described is effective in the case where an administrator has to quickly know the fact that, for example, a skier in a skiing area is lying on the ground on account of an injury, and where he/she is to cope quickly with such matters. In such a process, however, the possibility of an erroneous warning will be high unless a high precision positioning system, such as GPS, is available. More specifically, in the case of utilizing the base station of the PHS or portable telephone systems, the position of a third party can only be specified as the location of the base station. Therefore, even when the third party has actually moved a little, he/she might be judged as standing at an identical position. This holds true also in the case of the positioning based on the radio marker. Accordingly, the supervision of an abnormal situation of a third party should ideally be done under the conditions in which the GPS can be utilized to the utmost.

Figures 9A, 9B:
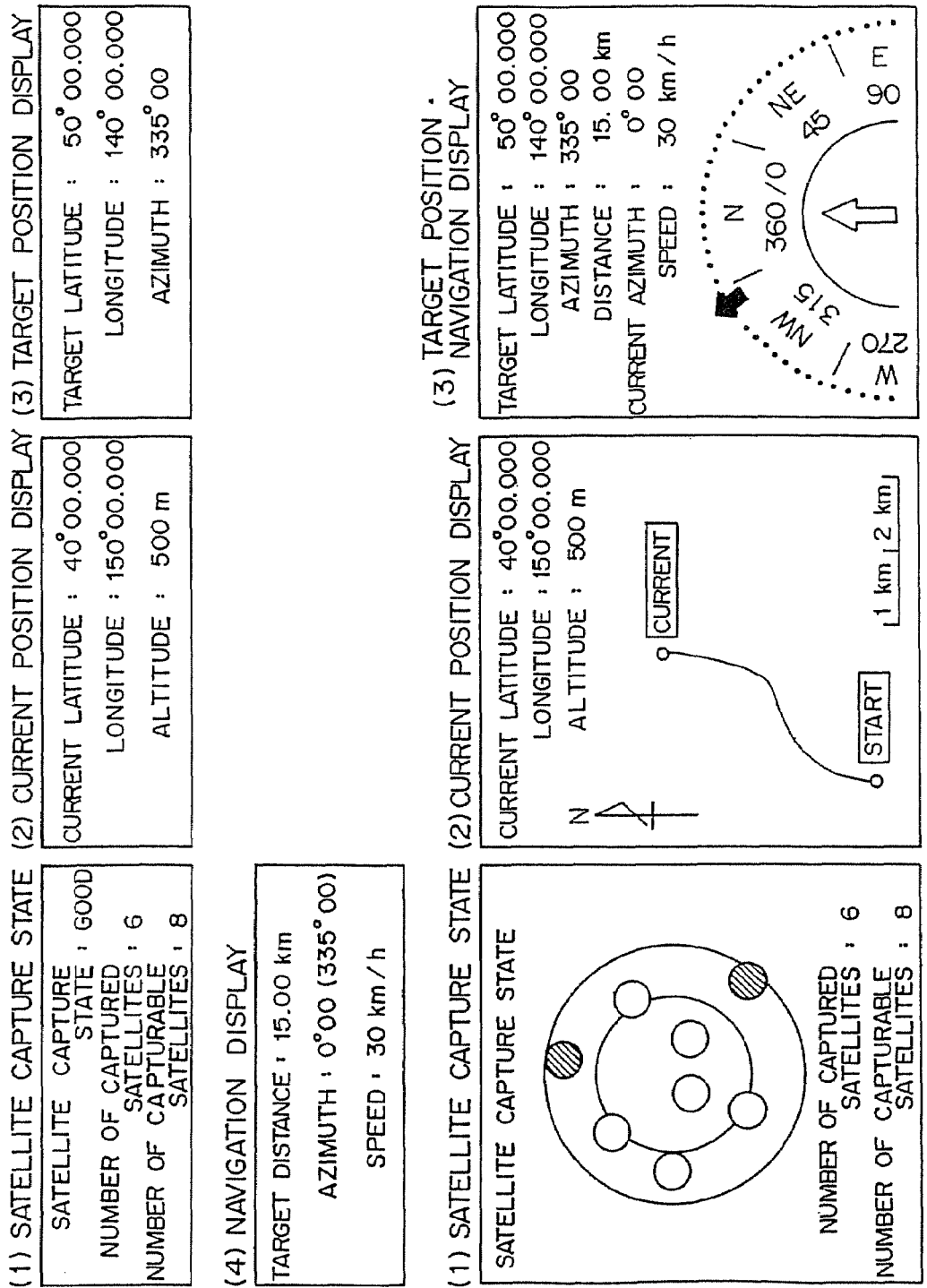
FIGS. 9A and 9B are diagrams each showing a display example which is presented on the display screen of a portable terminal in the system of the present invention.

FIGS. 9A and 9B illustrate display examples which are presented on the display screen of the portable terminal 11 (as shown in FIG. 1) in the system of the present invention.

FIG. 9A exemplifies character displays.

The display 1 indicates the capture state of the satellites in the GPS. Mentioned as exemplary display items are "Satellite capture state", "Number of captured satellites" and "Number of capturable satellites". The "number of captured satellites" is the number of the satellites from which radio waves are actually being received, while the "number of capturable satellites" is the number of the satellites which ought to be theoretically capturable in view of the current latitude and longitude of the portable terminal. In addition, the "satellite capture state" denotes the reception state of the radio waves from the satellites. By way of example, the "satellite capture state" is so stipulated that a "Good" state is determined when the "number of captured satellites" reaches 80% of the "number of capturable satellites". Alternatively, the "satellite capture state" may well be determined by calculating the ratio of noise contained in each radio wave, to the principal signal of the radio wave.

The display 2 indicates the current position of the portable terminal. The current latitude and longitude are displayed on the basis of the GPS. Further, a three-point measurement is performed using at least three satellites, and the altitude of the current position can also be displayed.

The display 3 indicates the target position of the portable terminal. The "target position" is, for example, the position of a specified site to which the holder of the portable terminal wants to go. In such a case, when the holder designates a specified position on a map, the portable terminal obtains the latitude and longitude of the specified site from the map and calculates the azimuth of the specified site from the current position. The display 3 indicates these physical quantities. That is, the latitude and longitude of the target spot and the azimuth from the current position are given as exemplary display items.

The display 4 indicates navigation to a target spot. Given as exemplary display items are a distance and an azimuth to the target location and the moving speed of the portable terminal. Regarding the distance to the target location, when the current position and the specified target location are indicated, the terminal automatically calculates the distance from the differences of the latitudes and longitudes of the two points. Regarding the azimuth, a direction in which the portable terminal is currently proceeding, and a direction to the target position as calculated from the current position and the target position (numerals indicated in parentheses) are obtained with the direction detector 20 mounted in the terminal, and they are displayed. The moving speed of the portable terminal can also be calculated by the built-in acceleration sensor of the direction detector 20, and the calculated result is displayed.

FIG. 9B exemplifies simplified graphic displays.

The display 1 indicates the capture state of the satellites. Herein, the number of captured satellites and the number of capturable satellites are displayed by characters, and the captured satellites and uncaptured satellites are also displayed by graphic images for discrimination.

The display 2 indicates the current position of the portable terminal. The current latitude, longitude and altitude are displayed by numerals, and the current position is displayed together with a path from the start location of navigation, using simple graphic images. Although not shown in the display 2, a map is actually displayed here, and the holder of the portable terminal can know the region where he/she is.

The display 3 indicates a target position and navigation. A target latitude, longitude, azimuth and distance and a current azimuth and speed are indicated as character information. A graphic image depicted at the lower part of the display 3 is the pattern of a compass so as to facilitate understanding of a target direction and a current proceeding direction. A white-painted arrow denotes the current proceeding direction, while a black-painted arrow denotes the direction of the target location.

FIGS. 10A-10D are views showing examples of the external appearances of the respective portable terminals of the present invention.

FIGS. 10A and 10B exemplify the external appearance of a terminal of a portable type. FIG. 10A is a front view, while FIG. 10B is a side view.

A display screen 50 for displaying navigation information, a map, etc. is provided on the front of the terminal, and a GPS antenna 51 is attached to the side part thereof. The GPS antenna 51 may be of either a built-in type or of a construction which is attached afterwards using a PC card slot or the like. Further, the GPS antenna 51 should preferably have a structure whose mounting portion can be moved flexibly so as to capture the radio waves from the satellite, and which can be faced upward in any attitude from the terminal. Incidentally, the terminal has the function of communications installed therein so that it can communicate with a central system. Without the communicating function, however, navigation based on the GPS is still possible.

FIGS. 10C and 10D exemplify the external appearances of the terminal of a portable telephone type.

FIG. 10C illustrates the state in which a flipper (cover) 54 is closed. A display screen 52 is provided on the front of the terminal. Navigation information and a map are displayed on the display screen 52. A GPS antenna 53 is disposed in the flipper 54, and it can capture the radio waves from the satellite so as to offer current position information etc. to the holder of the terminal.

FIG. 10D illustrates the state in which the flipper 54 is opened. When the flipper 54 is opened, input buttons 55 become visible, and they can be used for giving inputs in order to make a telephone call and to receive the services of navigation etc. There is a mouthpiece at the base of the flipper 54. Thus, the flipper 54 reflects the voice of a person so as to transmit the voice to the mouthpiece.

In this manner, a GPS antenna 53 is built into a part, such as flipper 54, including almost no electric circuitry therein, whereby the GPS function can be installed without enlarging the size of the terminal.

According to the present invention, it is possible to provide a position information management system of high serviceability in which the actions of, for example, an old person or a child can be supervised, in which persons holding portable terminals can acquire position information from each other, and in which an abnormal situation of a person holding a portable terminal can be quickly known.

What is claimed:

1. A position information management method for transmitting a location indicator indicating the location of a first terminal to a second terminal comprising steps of the computer:

reviewing a historical list generated by recording location indicators having been sent from the first terminal;

determining whether the first terminal stays at one location for a predetermined length of time and whether the first terminal is located within a predetermined monitoring target area based on data contained in the historical list; and providing a warning to the second terminal when and if the computer determines that the first terminal has stayed for the predetermined length of time at said one location within the predetermined monitoring target area in the determining step.

2. The position information management method according to claim 1 wherein:

the determining step is a step in which the computer further determines whether the first terminal has stayed at said one location for the predetermined length of time and whether it is within a predetermined monitoring time-zone currently based on data contained in the historical list; and the providing step is a step in which the computer provides the warning to the second terminal when and if the computer determines, in the determining step, that it is within the predetermined monitoring time-zone currently and the first terminal has stayed at said one location for the predetermined length of time.

3. The position information management method according to claim 1 wherein:

the determination step is a step in which the computer further compares the length of time the first terminal has stayed at said one location to a station period of a predetermined length in a manner based on data contained in the historical list; and the providing step is a step in which the computer provides the warning to the second terminal when and if the computer determines, in the determining step, the length of the first terminal staying at said one location having reached the station period of the predetermined length.

4. The position information management method according to claim 1, wherein:

data that is for predetermining any of the monitoring target area, the monitoring time-zone and the station period is provided from the second terminal to a center in advance.

5. The position information management method according to claim 1, wherein:

the providing step includes the computer sending to the second terminal an indicator indicating that it is impossible to obtain the location indicator from the first terminal when and if the computer does not receive the location indicator from the first terminal.

6. A position information management apparatus for transmitting a location indicator indicating the location of a first terminal to a second terminal comprising:

a storage unit storing a historical list generated for recoding location indicators having been sent from the first terminal;

a determination unit reviewing the historical list and determining whether the first terminal stays at one location for a predetermined length of time and whether the first terminal is located within a predetermined monitoring target area; and a providing unit providing a warning to the second terminal when and if the determination unit determines that the first terminal has stayed for the predetermined length of time at said one location within the predetermined monitoring target area.

7. The position information management apparatus according to claim 6, wherein:

the determination unit further determines whether the first terminal has stayed at said one location for the predetermined length of time and whether it is within a predetermined monitoring time-zone currently based on data contained in the historical list; and the providing unit provides the warning to the second terminal when and if the determination unit determines that it is within the predetermined monitoring time-zone currently and the first terminal has stayed at said one location for the predetermined length of time.

8. The position information management apparatus according to claim 6, wherein:

the determination unit further compares the length of time the first terminal has stayed at said one location to a station period of a predetermined length in a manner based on data contained in the historical list; and the providing unit provides the warning to the second terminal when and if the determination unit determines the length of the first terminal staying at said one location having reached the station period of the predetermined length.

9. The position information management apparatus according to claim 6, wherein;

data that is used by the determination unit and for predetermining any of the monitoring target area, the monitoring time-zone and the station period is provided from the second terminal to a center in advance.

10. The position information management apparatus according to claim 6, wherein:

the providing unit sends to the second terminal an indicator indicating that it is impossible to obtain the location indicator from the first terminal when and if the location indicator does not arrive from the first terminal.

11. The position information management method according to claim 2, wherein:

data that is for predetermining any of the monitoring target area, the monitoring time-zone and the station period is provided from the second terminal to a center in advance.

12. The position information management method according to claim 3, wherein:

data that is for predetermining any of the monitoring target area, the monitoring time-zone and the station period is provided from the second terminal to a center in advance.

13. The position information management apparatus according to claim 7, wherein;

data that is used by the determination unit and for predetermining any of the monitoring target area, the monitoring time-zone and the station period is provided from the second terminal to a center in advance.

14. The position information management apparatus according to claim 8, wherein;

data that is used by the determination unit and for predetermining any of the monitoring target area, the monitoring time-zone and the station period is provided from the second terminal to a center in advance.

* * * * *